United States Patent
Bakis et al.

(10) Patent No.: US 6,651,040 B1
(45) Date of Patent: Nov. 18, 2003

(54) METHOD FOR DYNAMIC ADJUSTMENT OF AUDIO INPUT GAIN IN A SPEECH SYSTEM

(75) Inventors: Raimo Bakis, Briarcliff Manor, NY (US); Francis Fado, Highland Beach, FL (US); Peter J. Guasti, Coral Springs, FL (US); Gary R. Hanson, Palm Beach Gardens, FL (US); Amado Nassiff, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/583,845

(22) Filed: May 31, 2000

(51) Int. Cl.[7] ............................ H03G 3/20; G10L 21/02
(52) U.S. Cl. ........................................ 704/225; 381/107
(58) Field of Search .................................. 704/215, 225, 704/226, 210, 224, 233; 381/104, 107, 94.8

(56) References Cited

U.S. PATENT DOCUMENTS

| | | | | |
|---|---|---|---|---|
| 4,015,088 A | * | 3/1977 | Dubnowski et al. | 704/208 |
| 4,543,537 A | * | 9/1985 | Kuhn et al. | 330/129 |
| 4,777,649 A | * | 10/1988 | Carlson et al. | 704/233 |
| 4,817,158 A | * | 3/1989 | Picheny | 704/224 |
| 5,687,241 A | * | 11/1997 | Ludvigsen | 381/312 |
| 5,784,476 A | * | 7/1998 | Bird | 381/107 |
| 5,822,718 A | | 10/1998 | Bakis et al. | |
| 6,266,632 B1 | * | 7/2001 | Kato et al. | 704/219 |

* cited by examiner

Primary Examiner—Marsha D. Banks-Harold
Assistant Examiner—Martin Lerner
(74) Attorney, Agent, or Firm—Akerman Senterfitt

(57) ABSTRACT

A method for adjusting audio input signal gain in a speech system can include seven steps. First, an upper and a lower threshold can be predetermined in which the upper and lower threshold define an optimal range of audio data signal amplitude measurements. Second, a frame of unpredicted digital audio data samples can be received. Each sample can indicate an amplitude measurement of the audio data signal at a particular point in time. Third, a maximum signal amplitude can be calculated for a configurable measurement percentile of the unpredicted digital audio data samples. Fourth, the audio input signal gain can be incrementally adjusted downward if the maximum signal amplitude exceeds the upper threshold. Conversely, fifth, the audio input signal gain can be incrementally adjusted upward if the maximum signal amplitude falls below the lower threshold. Sixth, additional frames of unpredicted digital audio data samples can be received. Finally, seventh, each of the third through the sixth steps can be repeated with the received additional frames until the calculated maximum signal amplitude falls within the optimal range of audio signal amplitude.

40 Claims, 5 Drawing Sheets

METHOD FOR DYNAMIC ADJUSTMENT OF AUDIO INPUT GAIN IN A SPEECH SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech systems and more particularly to a method and apparatus for dynamically adjusting audio input gain according to conditions sensed in an audio input signal to a speech system.

2. Description of the Related Art

Speech systems are systems which can receive an analog audio input signal representative of speech and subsequently digitize and process the audio input signal into a digitized speech signal. Speech signals, unlike general audio signals, contain both speech data and silence data. That is, in any given sample of audio data representative of speech, a portion of the signal actually represents speech while other portions of the signal represent background noise and silence. Hence, in performing digital processing on an audio signal, a speech system must be able to differentiate between speech data and background and silence data. Accordingly, speech systems can be sensitive to the quality of an audio input signal in performing this necessary differentiation.

The quality of an audio input signal can be particularly apparent in a handheld, portable speech system. Specifically, users of portable speech systems often provide speech input to the speech system in varying environmental conditions. For example, a user of a portable speech system can dictate speech in car, in an office, at home in front of the television, in a restaurant, or even outside. Consequently, many environmental factors can affect the quality of speech input. When in a car, interior cabin noise can be included in the speech signal. When in an office, a ringing telephone can be included in the speech signal. When outside, the honking of a passing car can be included in the speech signal. As a result, the portion of a speech input which is to be interpreted as speech data can vary depending on what is to be interpreted as background "silence"—car honking, television programming, telephone ringing, interior cabin noise, or true silence.

The problem of speech signal quality in identifying speech data in a speech system can be compounded by the process of speech recognition. Speech recognition is the process of converting an acoustic signal, captured by transducer, for instance a microphone or a telephone, to a set of words. The recognized words can be the final results, as for applications such as commands & control, data entry, and document preparation. They can also serve as the input to further linguistic processing in order to achieve speech understanding. Speech recognition is a difficult problem, largely because of the many sources of variability associated with the signal.

First, the acoustic realizations of phonemes, the smallest sound units of which words are composed, are highly dependent on the context in which they appear. These phonetic variables are exemplified by the acoustic differences of the phoneme /t/ in two, true, and butter in American English. Second, differences in sociolinguistic background, dialect, and vocal tract size and shape can contribute to across-speaker variables. Third, acoustic variables can result from changes in the environment as well as in the position and characteristics of the transducer. Finally, speaker variables can result from changes in the speaker's physical and emotional state, speaking rate, or voice quality.

The speech recognition accuracy of a speech-to-text conversion system depends directly upon the quality of an audio input signal containing the speech data to be converted to text. Specifically, it is desirable for the amplitude of an audio input signal to fall within an optimal range. While the specific limits of the desired range can vary from speech recognition engine to speech recognition engine, all speech recognition engines can experience imperfect speech recognition performance when the amplitude of an audio input signal falls outside of an acceptable range.

Specifically, an audio input signal having an amplitude falling below an extremely low level—an insufficient signal—can cause the degradation of speech recognition performance of a speech recognition engine. Correspondingly, an audio input signal having an amplitude exceeding an extremely high level can result in a saturated signal, a clipping condition as well as signal distortion. An insufficient or excessive audio signal can arise in response to a variety of conditions. For example, when providing speech input to a speech system, the speaker can move either the speaker's head with respect to the microphone or the microphone with respect to the speakers head. Also, the speaker inadvertently can change the volume of the speaker's voice or the input volume controlled by the audio circuitry used to receive the speech input audio signal.

When configuring a speech system, speech systems typically measure the characteristics of an audio input signal for a particular speaker using a particular microphone. Using these measured characteristics, the speech system can set system parameters to optimize the amplification and conditioning of the audio signal. Thus, in the case where different speakers provide audio input to the same speech system at different times, the speech system parameters can prove inadequate to accommodate the subsequent speaker for which the parameters had not been optimized. Likewise, in the case where different microphones are used at different times to provide speech audio input to the same speech system, the speech system parameters can prove inadequate to accommodate the second microphone for which the parameters had not been optimized. As a result, in either case, an insufficient or excessive audio signal condition can arise.

Present speech systems have yet to adequately address the problem of varying amplitudes of speech audio input signals. Specifically, what is needed is a method for monitoring the amplitude of a speech audio input signal during a speech session and adjusting the amplitude of the speech audio input signal accordingly. Hence, there exists a present need for dynamically adjusting audio input gain in a speech system.

SUMMARY OF THE INVENTION

A method for adjusting audio input signal gain in a speech system can include seven steps. First, an upper and a lower threshold can be predetermined in which the upper and lower threshold define an optimal range of audio data signal amplitude measurements. Second, a frame of unpredicted digital audio data samples can be received. In particular, the unpredicted digital audio data samples can be acquired by audio circuitry in a computer system. Significantly, the digital audio data samples received are not pre-scripted and are unknown to the computer system at the time of reception with regard to speech content.

Each sample can indicate an amplitude measurement of the audio data signal at a particular point in time. As such, third, a maximum signal amplitude can be calculated for a configurable measurement percentile of the unpredicted digital audio data samples. A measurement percentile is a selected percentage of samples in the digital audio data upon which computations are to be performed. For example, the calculation of the maximum signal amplitude for the ninety-eighth (98th) measurement percentile means the maximum signal amplitude for the first ninety-eight (98) percent of all samples in the frame.

Subsequent to the calculation of the maximum signal amplitude for the configured measurement percentile, fourth, the audio input signal gain can be incrementally adjusted downward if the maximum signal amplitude exceeds the upper threshold. Conversely, fifth, the audio input signal gain can be incrementally adjusted upward if the maximum signal amplitude falls below the lower threshold. Sixth, additional frames of unpredicted digital audio data samples can be received. Finally, seventh, each of the third through the sixth steps can be repeated with the received additional frames until the calculated maximum signal amplitude falls within the optimal range of audio signal amplitude.

In the one embodiment, in addition to the upper and lower thresholds, a full scale threshold can be predetermined above which a clipping condition is considered to have occurred. A clipping condition can be detected by first calculating a maximum signal amplitude for the digital audio data samples in the received frame. If the calculated maximum signal amplitude exceeds the full scale threshold, a downward adjustment can be calculated if necessary to bring the maximum signal amplitude within the optimal range. Subsequently, the audio input signal gain can be adjusted downward by the calculated downward adjustment. A clipping condition can also be determined by calculating a hypothetical signal peak amplitude. If the calculated hypothetical signal peak amplitude exceeds the full scale threshold, again, a downward adjustment can be calculated and performed if necessary to bring the hypothetical peak amplitude within the optimal range.

Notably, in another embodiment, a silence threshold can be calculated below which a quantity of digital audio data samples are interpreted as silence samples and above which a quantity of digital audio data samples are interpreted as speech samples. As a result of the calculation of a silence threshold, signal gain adjustments can occur only if the calculated maximum signal amplitude exceeds the silence threshold. Furthermore, in yet another embodiment, a silence timeout condition can be detected, the silence timeout condition occurring when no silence samples are received in a predetermined number of received frames. Responsive to detecting the silence timeout condition, the silence threshold can be increased by a proportional factor. Also, upon receiving an unpredicted frame of digital audio data samples having a maximum signal amplitude below the silence threshold, where as a result, the frame of digital audio data samples are interpreted as a frame of silence samples, a new silence threshold can be calculated based upon the maximum amplitude measurements of previously received silence samples. The new silence threshold can be calculated by first, storing a data set of previously received frames of silence samples, second, averaging the maximum amplitudes for each stored from in the data set, and, third, multiplying the average by a proportional factor.

Notably, two conditions can exist which have a bearing upon the calculation of a silence threshold in response to receiving silence samples in a frame. First, a clipping condition can exist in which samples exceeding the full scale threshold have been detected. Second, an initial condition can exist in which an adequate number of silence samples have yet been received in order to properly set the silence threshold. In either circumstance, a new silence threshold can be calculated based upon a maximum amplitude measurements of a second configurable measurement percentile of previously received speech samples. Specifically, the step of calculating a new silence threshold based upon maximum amplitude measurements of previously received speech samples can include storing a data set of previously received frames of speech samples and identifying a maximum amplitude for the second configurable measurement percentile of speech samples in each stored frame in the data set.

Significantly, the present invention can include histogram analysis techniques to identify whether the upper, lower and full scale thresholds have been breached. As a result, in a preferred embodiment of the present invention, an audio data histogram can be established. The audio data histogram can include a plurality of bins, each bin associated with a range of amplitude measurements and each bin having a corresponding counter. Each corresponding counter can be incremented in response to receiving a digital audio data sample having an amplitude measurement falling within an amplitude range associated with the corresponding bin. Thus, in response to receiving a digital audio data sample having an amplitude measurement falling within an amplitude range associated with a bin in the histogram, the counter associated with the bin can be incremented. Furthermore, the incrementing step can be repeated for each digital audio data sample in the frame, the repeating step populating the audio data histogram with histogram data derived from amplitude measurements of the digital audio data samples.

The audio data histogram can be used in the adjusting steps of the preferred embodiment. Specifically, the step of incrementally adjusting downward can include first specifying a measurement percentile of digital audio data samples in the histogram upon which an adjustment is determined. Second, a cumulative sum of counters in the histogram can be obtained. Specifically, the summation can begin with the zero-th bin in the histogram and can continue until reaching the i-th bin below which the cumulative sum, When compared to all samples in the histogram, corresponds to the specified measurement percentile. Third, a maximum signal amplitude corresponding to samples in the i-th bin can be calculated. The calculation can be based upon only those samples in the i-th bin which are included in the specified measurement percentile of digital audio data samples. Finally, fourth, the audio input signal gain can be incrementally adjusted downward if the calculated maximum signal amplitude corresponding to the samples in the i-th bin exceeds the upper threshold.

Similarly, the step of incrementally adjusting upward the audio input signal gain can include first specifying a measurement percentile of digital audio data samples in the histogram upon which an adjustment is determined. Second, a cumulative sum of counters in the histogram can be obtained. Specifically, the summation can begin with the zero-th bin in the histogram and can continue until reaching the i-th bin below which the cumulative sum, when compared to all samples in the histogram, corresponds to the specified measurement percentile. Third, a maximum signal amplitude corresponding to samples in the i-th bin can be calculated. The calculation can be based upon only those samples in the i-th bin which are included in the specified measurement percentile of digital audio data samples. Finally, fourth, the audio input signal gain can be incrementally adjusted upward if the calculated maximum signal amplitude corresponding to the samples in the i-th bin falls below the lower threshold.

Preferably, a data set of audio data histograms can be stored upon which histogram computations can be performed. Advantageously, by basing histogram computations on an average of histogram computations for all histograms in a data set, anomalous measurements can be diluted. In consequence, it can be determined if the data set has been populated with audio data histograms prior to the gain adjusting steps. If it is determined that the data set has not been populated, the gain adjusting steps preferably are not performed. Moreover, all audio data histograms in the data set can be discarded responsive to an audio gain adjustment.

In yet another embodiment, a silence data histogram can be incorporated. Like the audio data histogram, the silence data histogram can include a plurality of bins, each bin associated with a range of amplitude measurements and each bin having a corresponding counter. The corresponding counter can be incremented in response to receiving a silence sample having an amplitude measurement falling within an amplitude range associated with the corresponding bin. Furthermore, in response to receiving a silence sample having an amplitude measurement falling within an amplitude range associated with a bin in the histogram, the counter associated with the bin can be incremented. The incrementing step can be repeated for each silence sample in the frame, the repeating step populating the silence data histogram with histogram data derived from amplitude measurements of the silence samples.

Advantageously, the silence data histogram can be used in the step of calculating a new silence threshold. In that case, the calculating step can include storing a silence data set of silence data histograms and averaging maximum amplitudes for each histogram in the silence data set. Finally, the average can be multiplied by a proportional factor. The resulting value can be the new silence data threshold. As in the case of the data set of audio data histograms, however, it can be determined if the silence data set has been populated with silence data histograms prior to the silence threshold calculating step. If it is determined that the silence data set has not been populated, the silence threshold calculating step preferably is not performed. Moreover, all silence data histograms in the silence data set can be discarded in response to either an audio gain adjustment or the calculation of a new silence threshold.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a method for adjusting audio input gain according to conditions sensed in an audio input signal to a speech system. The method can be incorporated in a computer program, referred to as an Audio Optimizer, which can execute in a computer system and monitor an audio input signal received in computer system audio circuitry. The Audio Optimizer can adjust the audio input gain of the audio circuitry according to various thresholds required by the speech system also executing in the computer system in order to maintain an average amplitude of the audio input signal within a specified optimal range.

Figure 1:
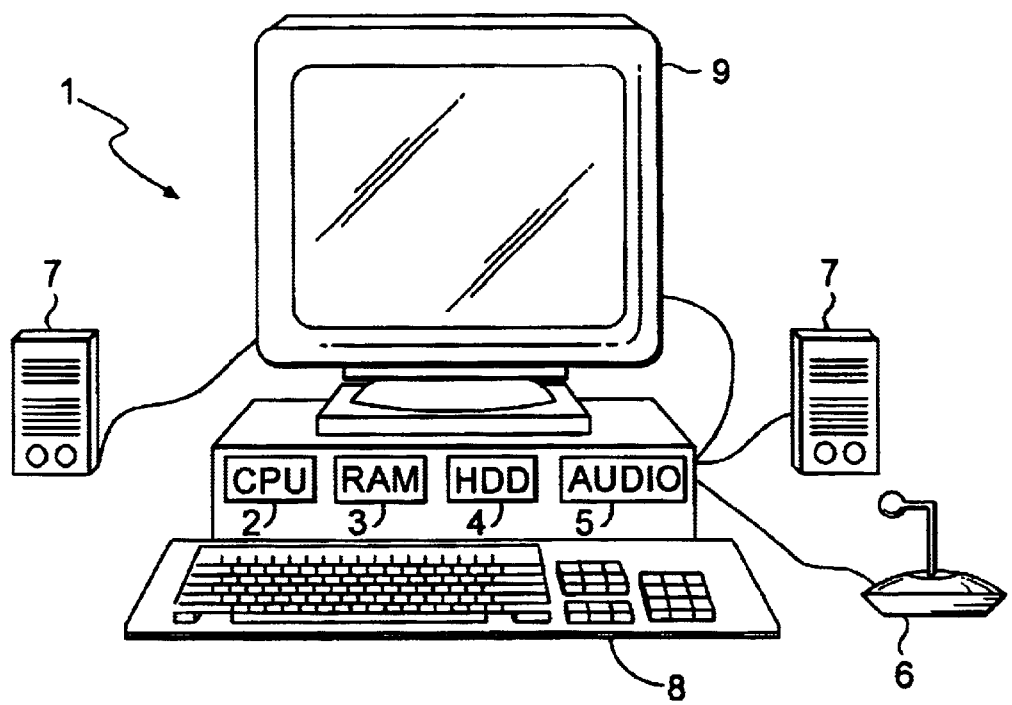
FIG. 1 is a pictorial representation of a computer system configured for use with the present invention.

FIG. 1 is a schematic diagram illustrating a computer system 1 configured for use with the present invention. The computer system 1 is preferably comprised of a computer including a central processing unit (CPU) 2, one or more volatile and non-volatile memory devices 3, 4 and associated circuitry. The volatile memory devices 3, 4, preferably are comprised of an electronic random access memory 3 and a bulk data storage medium 4, such as flash memory or a magnetic disk drive. The computer system can include an input transducer 6, for example a microphone, as well as an audio output device 7, for example speakers, both which are operatively connected to the computer system 1 through suitable audio circuitry 5 also referred to as a "sound board". Additionally, the computer system 1 can include a keyboard input device 8, a pointing device, for instance a mouse (not shown), and at least one user interface display unit 9 such as a video data terminal (VDT), each operatively connected to the computer system 1. Still, neither the VDT 9, keyboard 8, mouse, nor the speakers 7, are necessary for operation of the invention as described herein. In fact, in the preferred embodiment, the computer system 1 is an embedded computer system suitable for use in a portable device, for example a cellular phone, a personal digital assistant or a vehicle navigation system. Such embedded systems are well-known in the art and are embodied in such embedded platforms as the Workpad® manufactured by International Business Machines Corporation. Notwithstanding, the various hardware requirements for the computer system as described herein also can generally be satisfied by any one of many commercially available high speed multimedia personal computers such as those offered and manufactured by International Business Machines Corporation.

Figure 2:
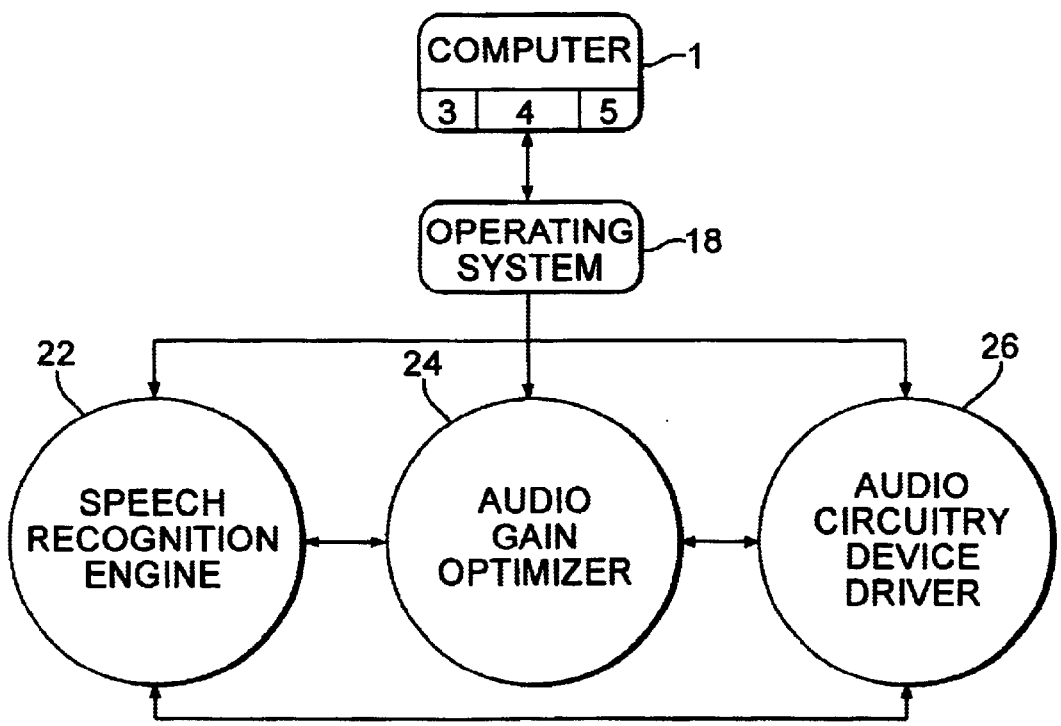
FIG. 2 is a schematic diagram of a computer system architecture implemented in the computer system of FIG. 1 and configured for use with the present invention.

FIG. 2 illustrates a typical architecture for a computer system configured to dynamically adjust audio input gain according to conditions sensed in an audio input signal to a speech system executing in the computer system 1 of FIG. 1. In the preferred embodiment, the speech system can include a speech recognition capability for converting speech input into recognized text. Still, the invention is not intended to be so limited. Rather, it is intended that the present invention solve the problem of maintaining analog audio input signal quality in any speech system, regardless of whether such speech system also performs speech-to-text conversion of the audio input signal.

In the preferred embodiment, however, as shown in FIG. 2, the computer system 1 typically includes an operating system 18 and a Speech Recognition Engine 22. In the example shown, an Audio Gain Optimizer 24 and an Audio Circuitry Device Driver 26 are also provided. In FIG. 2, the Speech Recognition Engine 22, Audio Gain Optimizer 24, and the Audio Circuitry Device Driver 26 are shown as separate application programs. It should be noted however that the invention is not limited in this regard, and these various application programs could be implemented as a single, more complex applications program. For example the Audio Gain Optimizer 24 could be combined with the Audio Circuitry Device Driver 26 or with any other application to be used in conjunction with the Speech Recognition Engine 22. Notwithstanding, in the preferred embodiment, the Audio Gain Optimizer 24 exists without combination in a software layer between the operating system and the Speech Recognition Engine 22.

In a preferred embodiment which shall be discussed herein, operating system 24 is an embedded operating system, such as QNX Neutrino® or Wind River System's VxWorks®. However, the system is not limited in this regard, and the invention can also be used with any other type of computer operating system, for example WindowsCE® or WindowsNT®. The operating system 18 can be stored in the fixed storage 4 of the computer system 1 along with the Speech Recognition Engine 22, the Audio Gain Optimizer 24 and the Audio Circuitry Device Driver 26. Upon bootstrap, the computer system 1, using bootstrap techniques well-known in the art, can load the operating system 18 into random access memory 3. Subsequently, the computer system 1 can cause the execution of the operating system 18.

The Audio Circuitry Device Driver 26 can load and execute concurrently with the operating system as is the case with typical device drivers. The Audio Circuitry Device Driver 26, like typical device drivers, can provide a software interface between the operating system and hardware circuitry, known in the art as a device, so that the operating system can control the device and can communicate data to and from the device. Notably, the Audio Circuitry Device Driver 26, like typical device drivers, can expose various methods contained in the software for manipulating and communicating with the audio circuitry 5. Notably, included among the exposed methods are methods for reading data from an incoming stream of digitized audio data, and methods for setting the audio input gain in the pre-amplifier contained in the audio circuitry 5. Hence, a method for adjusting audio input gain according to conditions sensed in an audio input signal to the Speech Recognition Engine 22, as embodied in the Audio Gain Optimizer 24, can monitor an audio input signal received in the audio circuitry 5 and can manipulate the audio input gain of the audio circuitry 5, both using the exposed methods of the Audio Circuitry Device driver 26.

The Audio Gain Optimizer 24 can implement a method for adjusting audio input gain according to conditions sensed in an audio input signal to the Speech Recognition Engine 22. Specifically, subsequent to loading and executing the operating system 18 and corresponding device drivers, including the Audio Circuitry Device Driver 26, a user can load and execute the Speech Recognition Engine 22 included as part of a speech recognition system. Notably, the Audio Gain Optimizer 24 can be included as part of either the Speech Recognition Engine 22 or the Audio Circuitry Device Driver 26. However, in the preferred embodiment, the Audio Gain Optimizer 24 stands alone. As such, the Audio Gain Optimizer 24 is further loaded and executed along with the Speech Recognition Engine 22.

When a speaker speaks into the transducer 6, the resulting electrical analog signal can be passed to the audio circuitry 5 in the computer system 1. The audio circuitry 5, as is the case with typical sound boards known in the art, can process the analog signal in a pre-amplifier stage prior to passing the processed signal to a CODEC and an A/D Converter stage for ultimate digitizing of the analog audio signal. The digital form of the audio signal preferably can be represented in pulse code modulation (PCM) format. PCM format consists of a series of binary-coded numbers, each representing the sampled value of the analog signal at a specific time point. The sampling rate for acquiring the digital data can be the industry standard 44.1 kilosamples per second, although in the preferred embodiment, the sampling rate can be 11.025 kilosamples per second.

The resulting digital audio signal can be supplied to the Audio Circuitry Device Driver 26 which can pass the digital signal to the operating system 18. The operating system 18, in turn, can pass the digital signal to the Audio Gain Optimizer 24. The Audio Gain Optimizer 24 can measure the signal amplitude of the incoming digital signal and compare the measured amplitude with stored amplitude thresholds. Depending upon the threshold range within which the average amplitude falls, the Audio Gain Optimizer 24 can adjust the audio input gain of the audio circuitry using the exposed methods of the Audio Circuitry Device Driver 26. Finally, either subsequently or concurrently, the Audio Gain Optimizer 24 can pass the digital audio signal to the Speech Recognition Engine 22 for processing. Ultimately, the Speech Recognition Engine 22 can perform speech-to-text conversion of the digital audio data and provide the text result to a speech-enabled application, for example a dictation client. Still, the invention is not so limited by the performance of speech-to-text conversion of the audio input signal. Rather, the present invention relates to the dynamic adjustment of audio signal gain responsive the measured conditions of the audio input signal.

FIGS. 3A–3D, taken together, are a flow chart illustrating a method for adjusting audio input gain according to conditions sensed in an audio input signal to a speech recognition system. The method as disclosed herein can be implemented in software and embodied in the Audio Gain Optimizer 24. The flow chart depicts the actions performed by the Audio Gain Optimizer 24 in response to receiving digital audio signal data from the audio circuitry 5 via the Audio Circuitry Device Driver 26. The software can be implemented by a programmer, using commercially available development tools for the operating systems described above, for example C or C++.

In order to properly monitor and analyze a digital audio signal, first it is preferable to generate a histogram of PCM values. The histogram can be used to generate diagnostic percentiles which, correspondingly, can be used to determine both the necessity and magnitude of an audio gain adjustment. More particularly, during the execution of the Audio Gain Optimizer 24, both an audio data histogram and a silence data histogram can be constructed and maintained which tracks the frequency of amplitude measurements in particular amplitude ranges based upon a static signal gain setting. The measured audio signal data frequency (and correspondingly, the silence signal data frequency) can be used subsequently to determine both the initial setting of thresholds, more fully discussed below, and subsequent incremental changes in the signal gain. When the signal gain changes, however, the histograms become invalid and, in consequence, need be discarded.

U.S. Pat. No. 5,822,718 issued on Oct. 13, 1998 to Bakis et al. for DEVICE AND METHOD FOR PERFORMING DIAGNOSTICS ON A MICROPHONE, incorporated herein by reference, teaches a preferred method of collecting digital audio data and generating a histogram for analyzing audio characteristics of an audio signal. Initially, a frame of digital audio data can be read from the buffers of the audio circuitry 5. A typical frame can represent a 1/10 second of digital audio data. The amplitude of the digital audio data contained in the frame can be a two-byte value encoded in PCM format and can range from 0 to 32,767 for each sample in the frame. As disclosed in the Bakis specification, first dc bias current can be removed using the formula $y_i = |x_i - b|$ where $y_i$ is the bias-corrected signal amplitude of the i-th sample and b is the dc bias defined as $$b = \frac{1}{N} \sum_{i=1}^{N} x_i$$

where $x_i$ is the PCM signal value at the i-th sample and N is the total number of samples in the frame.

Each bias corrected sample $y_i$ subsequently can be assigned to "bins" in a histogram. To determine the sizes of the bins, the program 12 first, the largest and smallest sample values of y can be identified and labeled $y_{max}$ and $y_{min}$. The difference between $y_{max}$ and $y_{min}$ can be defined as the range and can be divided into some number M of equal bins. In the preferred embodiment, M=100. Hence, the width of each bin in the preferred embodiment is $$w = \frac{y_{max} - y_{min}}{M} + \varepsilon$$

where w is the width and $\varepsilon$ is added to the width of the bin to ensure that the total range covered by all the bins is sufficient despite possible rounding errors. In the preferred embodiment, all computations are performed using integers. Accordingly, $\varepsilon=1$ is used.

For each bin, an upper and lower boundary of the bin can be calculated in order to determine a range of sample values represented therein. The lower boundary can be calculated according to the formula $l_j = y_{min} + (j-1)w$ where $l_j$ is the lower boundary for the j-th bin. Correspondingly, the upper boundary can be calculated according to the formula $u_j = y_{min} + jw$ where $u_j$ is the upper boundary for the j-th bin. As a result, for each dc bias-corrected sample $y_i$ calculated in the Audio Optimizer 26, a corresponding bin number $j_i$ can be computed according to the formula $$j_i = 1 + \frac{y_i - y_{min}}{w}.$$

Notably, $j_i$ can be rounded down to the nearest integer. Thus, $j_i$ always has an integer value.

Each bin can have associated therewith a counter. The Audio Gain Optimizer 26 can process each sample in the frame and can compute a corresponding bin number. For each sample computed to correspond to the j-th bin, the associated counter can be incremented. As a result, each counter indicates the number of samples (count) having an amplitude falling within the range defined by the associated bin. The resulting collection of counts is the histogram. From the histogram, measurement percentiles can be calculated as follows: $c_j = c_{j-1} + n_j$ where $n_j$ is the value of the counter in the j-th bin and $c_1 = n_1$.

Accordingly, to determine the PCM value corresponding to the p-th percentile in the histogram, the Audio Gain Optimizer 26 can calculate the number of sample values falling below that percentile using the equation $$L_p = \frac{pc_M}{100}$$

where L is the number of sample values falling below the percentile p and $c_M$ is the cumulative number of counts in the list bin. Notably, $L_p$ is the cumulative number of counts in the last bin. Hence, $L_p$ is the total number of samples represented by the histogram. $L_p$, however, may be smaller than the total number of samples measured in the frame, N, because some samples from the signal are omitted to avoid noise transients, etc. Subsequently, the Audio Gain Optimizer 26 can identify a bin where the cumulative number of counts therebelow is exactly $L_p$. If the Audio Gain Optimizer 26 cannot find a bin having this exact match, a bin can be selected such that the lower bound falls below $L_p$ and upper bound is above $L_p$. In that circumstance, the PCM value can be estimated by linear interpolation.

Preferably, the Audio Gain Optimizer 24 can store several histograms in a FIFO list of histograms known as a histogram data set. In the preferred embodiment, the ten most recent histograms of audio speech data and the ten most recent histograms of silence data are stored in two separate data sets. Once the data set has been populated with histograms, a subsequently added histogram can be inserted at the head of the list and the least recently used histogram can be discarded from the tail of the list.

Significantly, the Audio Gain Optimizer 24 includes a table of configurable thresholds, each configured threshold corresponding to a specific amplitude beyond which necessity for an adjustment to the audio gain can be specified. In the preferred embodiment, the table of threshold can be as follows:

| Threshold Name | Definition | Action |
|---|---|---|
| Full Scale (FST) | Maximum Signal Amplitude | Adjust Gain Downward |
| Upper Change (UCT) | Exceeds Optimal Range | Minimal Adjust Gain Downward (if necessary) |
| Upper Target (UTT) | Optimal Range Upper Boundary | No Action |
| Lower Target (LTT) | Optimal Range Lower Boundary | No Action |
| Lower Change (LCT) | Falls Short of Optimal Range | Minimal Adjust Gain Upward (if necessary) |
| Silence (ST) | Minimum Speech Input Level | No Action |
| Minimum (MT) | Minimum Signal Level | No Action |

The FST corresponds to the maximum allowable signal amplitude. Any signal having an average amplitude which exceeds the corresponding FST is considered a clipping condition and will result in the gain being adjusted downward. Any signal having an average amplitude which exceeds the corresponding UCT, but falls below the corresponding FST, is considered to have exceeded the optimal range, but not to have triggered a clipping condition. As a result, only a minimal downward gain adjustment may be warranted. Any signal having an average amplitude falling between the threshold defined by the UTT and the LTT is considered to fall within an optimal range. As such, no gain adjustment is warranted. The ST is the minimum speech input level. Below the ST, the signal is considered silence and no gain adjustments are made. Additionally, the MT is the minimum signal level. The MT can accommodate sound cards that cannot inherently provide a zero-signal level.

Finally, similar to the UCT, any signal having an average amplitude which falls below a corresponding LCT, but exceeding the ST is considered to have fallen below the optimal range, but not to have fallen so below as to be considered silence data. As a result, only a minimal upward gain adjustment may be warranted.

The table below illustrates preferred thresholds for use in the present invention. Notably, in the preferred embodiment, the digitized amplitude associated with a particular threshold is stored in a two byte variable. Hence, the digitized amplitude can be stored in the variable can range from 1 to 32,768. Additionally, for the purpose of simplicity, the digitized amplitude is provided relative to a peak amplitude of 100%. Notwithstanding, in the preferred embodiment, the digitized amplitude thresholds are scaled in accordance with a configurable measurement percentile, for instance 98%.

| Threshold | Digitized Amplitude | DBFS | Relative to Target |
| --- | --- | --- | --- |
| FST | 32K | 0 dB | +6 dBr |
| UCT | 22K | −3.3 dB | +2.8 dBr |
| UTT | 17K | −5.5 dB | +0.5 dBr |
| LTT | 15K | −6.6 dB | −0.6 dBr |
| LCT | 12K | −8.5 dB | −2.5 dBr |
| ST | 2K | −24 dB | −18 dBr |
| MT | 1 count | −90 dB | −84 dBr |

Figure 3A:
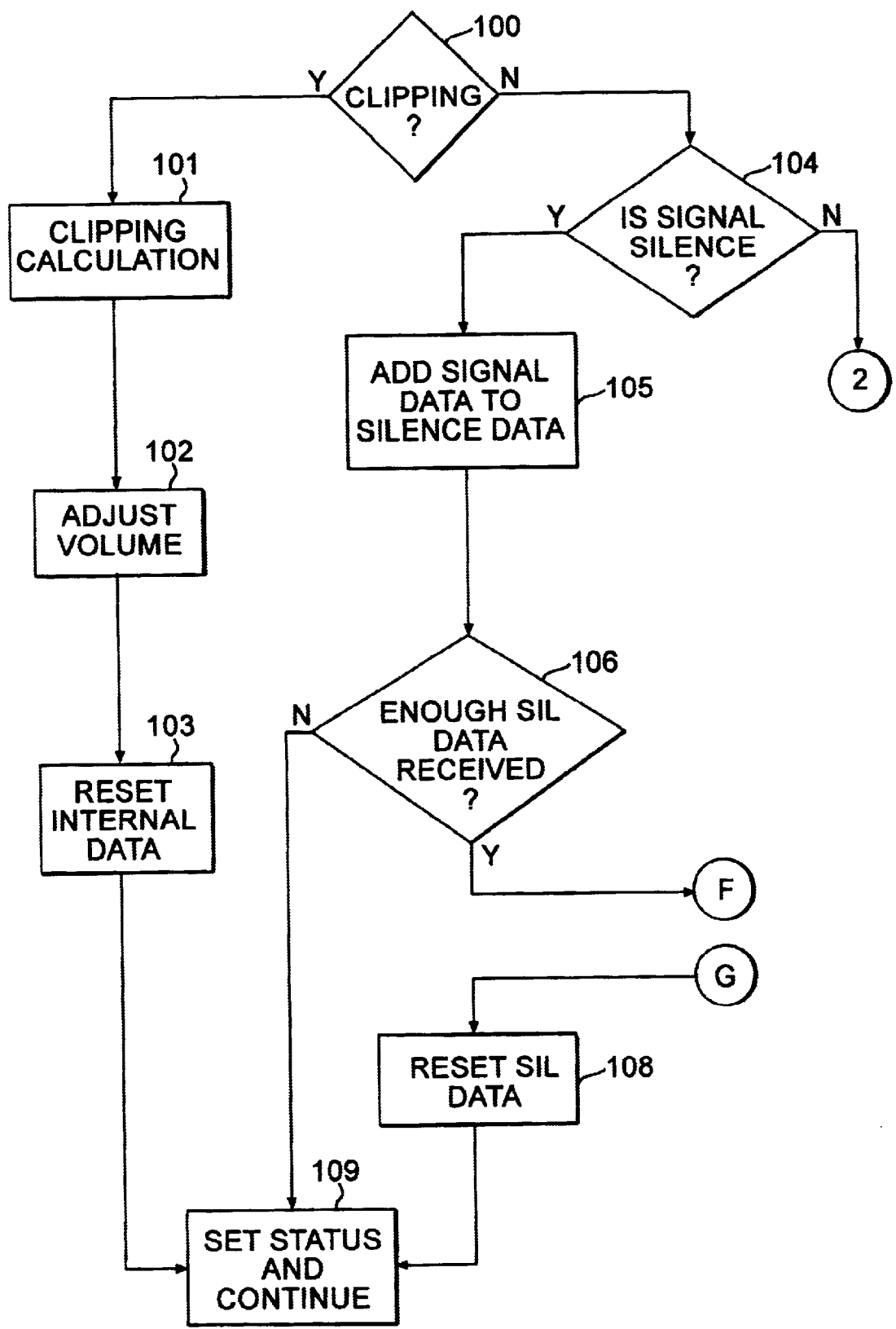
FIGS. 3A–3D, taken together, are a flow chart illustrating a method for adjusting audio input gain according to conditions sensed in an audio input signal to a speech recognition system.

Turning now to FIG. 3A, the method begins in step 100 in which samples of digital audio data in an acquired frame of digital audio data can be used to populate a histogram which can subsequently be examined for a clipping condition. A clipping condition can occur when the maximum signal amplitude of a portion of an audio input signal exceeds a pre-determined clipping threshold also referred to as the "Full Scale Threshold" (FST). In the preferred embodiment, if three times the interpolated maximum signal amplitude of the ninety-fifth (95th) percentile exceeds the present FST threshold, a clipping condition can be identified. Alternatively, if the maximum signal amplitude of the one-hundredth (100th) percentile of the samples in the acquired frame exceeds the preset FST threshold, a clipping condition can be identified. Notably, the maximum signal amplitude of the 100th percentile can be tracked simply by storing the measured maximum signal amplitude of the digital audio data in each frame. The stored amplitude can be updated upon reading each sample in the frame of digital audio data. In consequence, the maximum amplitude can be observed at any time simply by examining the stored maximum amplitude.

When a clipping condition occurs, the Audio Gain Optimizer 24 can adjust the signal gain downward in a more dramatic fashion than when the amplitude of the digital audio signal is merely out of optimal range. In particular, in step 101 a clipping calculation can be performed in which an estimated PCM value can be computed for the clipped signal based on the PCM value for the FST. The level of downward gain adjustment can be determined in order to bring the PCM value into the optimal range and can be based upon the result of a clipping calculation.

The clipping calculation can be performed in at least two ways. First, in the case in which three times the maximum signal amplitude of the 95th measurement percentile exceeds the maximum signal amplitude of the 100th percentile, the clipping calculation can determine that the value represented by three times the maximum signal amplitude of the 95th measurement percentile represents a hypothetical signal peak which could be measured in the absence of a clipping condition. Alternatively, the maximum signal amplitude of the 100th percentile can be the hypothetical signal peak. In the preferred embodiment, the clipping calculation chosen is based on the higher of three times the maximum signal amplitude of the 95th percentile and the maximum signal amplitude in the 100th percentile. Subsequently, a downward adjustment corresponding to the hypothetical signal peak can be referenced in an overdrive table containing downward signal gain adjustments based upon pre-collected empirical signal data. In the overdrive table, each hypothetical signal peak corresponds to a pre-determined downward audio signal gain adjustment. Subsequently, in step 102, the audio signal gain can be adjusted downwardly by the amount specified in the overdrive table. More particularly, an exposed method in the Audio Circuitry Device Driver 26 can be invoked for reducing the signal gain. After the downward adjustment, in step 103, the ST can be reset to zero (0) counts. Additionally, the audio data histograms can be discarded.

In the preferred embodiment, in addition to the audio data histogram, the Audio Gain Optimizer 24 further can store the internal status of the Audio Gain Optimizer 24. Specifically, the Audio Gain Optimizer 24 tracks the latest condition as a function of the threshold range in which the most recent amplitude average falls, as well as the resulting action performed, if any. For instance, if the most recent signal average exceeds the FST, the internal status will be set to a clipping condition. Furthermore, the resulting reduction in the signal gain will also be recorded in the internal status. Notably, the internal status can be exposed to a user of the Audio Gain Optimizer 24 through an application programming interface to the same. Consequently, in step 109, upon adjusting the signal gain in response to a clipping condition, the internal status of the Audio Gain Optimizer 24 can be updated and the next frame of data can be read.

Returning to step 100, if a clipping condition is not detected, in step 104 the maximum signal amplitude of a portion of the audio data as represented in the histogram is determined. Experimentally, it is preferred that the maximum signal amplitude of the ninety-eighth (98th) percentile of the audio data signal is measured. The selection of the 98th percentile is known as the Measurement Percentile (hereinafter "MP"). Still, the present invention is not so limited by the selection of a particular MP. Rather, any suitable MP can be selected according to system requirements and the signal characteristics of an audio data signal subject to the method of the present invention.

In step 104, an interpolated maximum signal amplitude of the selected MP can be examined in order to detect a silence condition. In order to interpolate the maximum signal amplitude of a portion of the audio input signal, first a bin in the audio data histogram is identified in below which the designated portion of all digital audio samples resides. Subsequently, the maximum signal amplitude can be interpolated based upon the number of samples in the bin, the signal amplitude of the lower boundary of the bin and the upper boundary of the bin.

A silence condition can be detected when the maximum signal amplitude of the selected MP falls below the ST. If a silence condition is detected, in step 105 the histogram can be inserted a data set of silence data histograms. Notably, the silence data histogram can be similar to an audio data histogram in as much as the silence data histogram can indicate the frequency of measurement of audio signals interpreted as silence having a particular amplitude based upon a static signal gain setting. The silence data histogram data set can be used to subsequently set the ST.

However, the ST can not be calculated based upon the silence data histogram until enough silence data histograms been inserted into the silence data histogram data set in order to dilute the effects of anomalous signal amplitude measurements. Preferably, ten frames or one (1) second of measured audio data is adequate for populating a FIFO list of audio data histograms and ten (10) frames or one (1) second of measured silence is adequate for populating the list of silence data histograms. Hence in step 106, if enough silence data has not been collected, the method branches to step 109 in which the internal status can be updated and the next frame can be read.

Figure 3B:
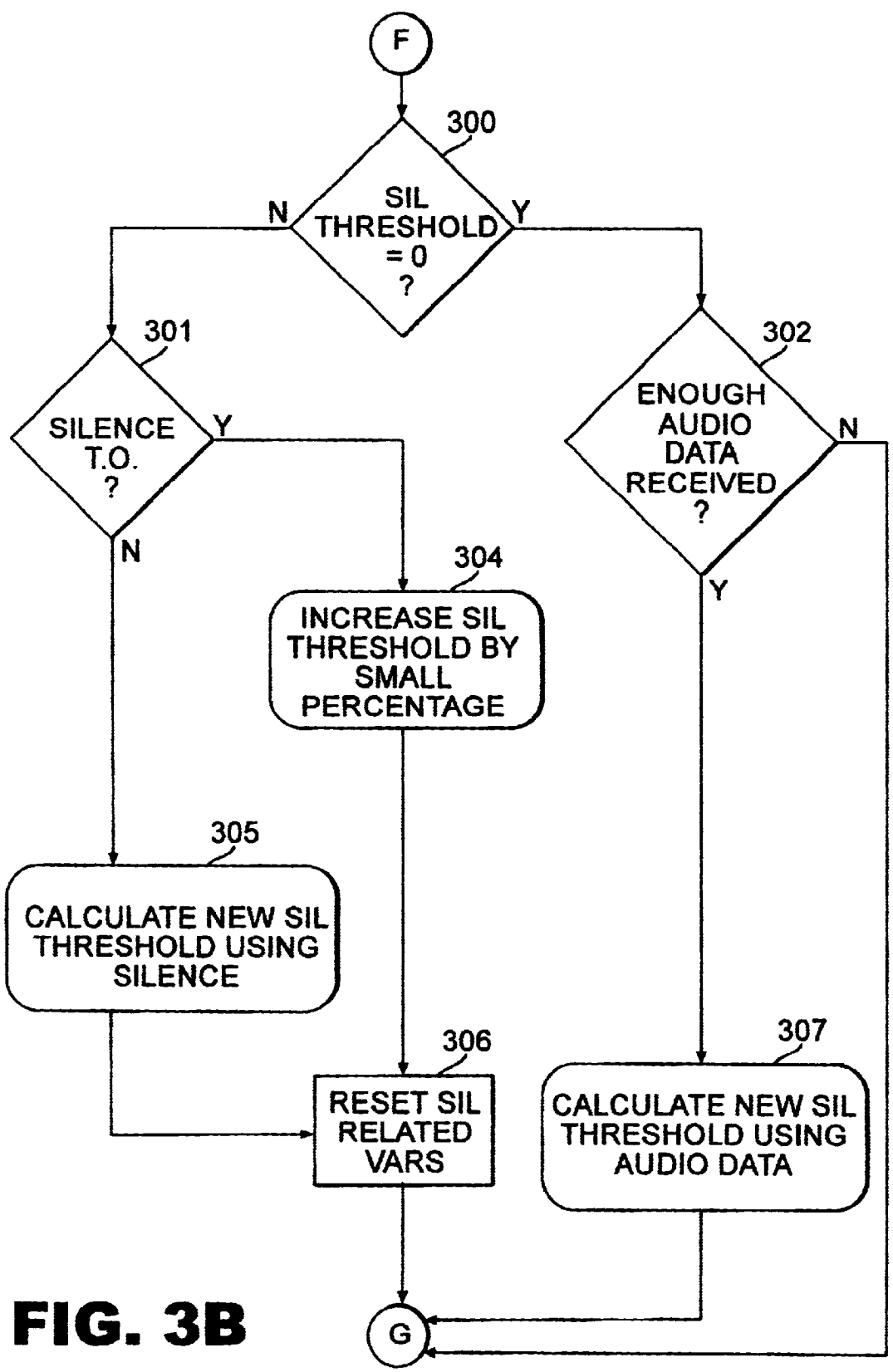

Returning to step 106, if a satisfactory number of silence data histograms have been inserted into the silence data histogram data set, the method branches through jump circle F to step 300 in FIG. 3B. FIG. 3B illustrates the process for adjusting the ST. In the preferred embodiment, the ST is recalculated dynamically during run-time. It is assumed that if there is no silence observed for a pre-determined period of time, preferably one (1) second, then a silence time-out has occurred in which the ST has been set too low, causing silence to be misinterpreted as speech. In such a situation, the ST is increased. Likewise, the Audio Gain Optimizer 26 can distinguish between background noise and speech data. In situations where the ST is set lower than the background noise level, the ST can be increased so that the ST is at a higher level than the background noise level.

The above-identified process is illustrated beginning in step 300, in which it is determined if the ST has been set to zero (0) counts indicating either an initial condition or a clipping condition. If the ST has been set to zero (0) counts, in step 302 it is determined if the audio data histogram data set has been sufficiently populated to calculate a new ST. If the audio data histogram set has been sufficiently populated with audio data histograms, so that background noise can be distinguished from the audio signal, in step 307, a new ST is calculated based on the level of background noise so that the ST is above the background noise level. In the preferred embodiment, the ST is calculated based on the average of interpolated maximum signal amplitude measurements of the twenty-fifth (25th) percentiles of each audio data histogram in the audio data histogram data set. Otherwise, no adjustment of the ST occurs. In either case, returning through jump circle G to step 108 in FIG. 3A, the silence data histograms can be discarded. Subsequently, in step 109 the internal status can be updated and the next frame can be read.

Returning now to step 300 in FIG. 3B, if the ST has not been set to zero (0) counts, indicating a run-time condition and not an initial condition or a clipping condition, in step 301 it is determined if a silence time-out condition has arisen. Specifically, in the preferred embodiment, if silence data has not been detected for a pre-determined period of time, for example 10 (10) frames, it is assumed that the ST has been set too low causing silence data to be misinterpreted as speech data. Accordingly, in step 304, the ST is increased by a proportional factor, preferably 1.5. Notably, the ST preferably cannot be increased beyond a maximum ST, which in the preferred embodiment can be set at 6,000 counts of amplitude. Otherwise, if a silence time-out has not occurred, a new ST can be calculated based upon the silence data histogram data set.

In step 305, the new ST can be proportionally based on the average maximum signal amplitudes for the 100th percentile. In the preferred embodiment, the ST is based on three times the average maximum signal amplitude for the 100th percentile of each silence data histogram in the silence data histogram data set. In any event, subsequent to either step 305 or step 304, in step 306, the silence data histograms can be discarded to accommodate the new ST. Furthermore, returning through jump circle G to step 108 in FIG. 3A, the silence data histograms can be discarded. Subsequently, in step 109 the internal status can be updated and the next frame can be read.

Figure 3C:
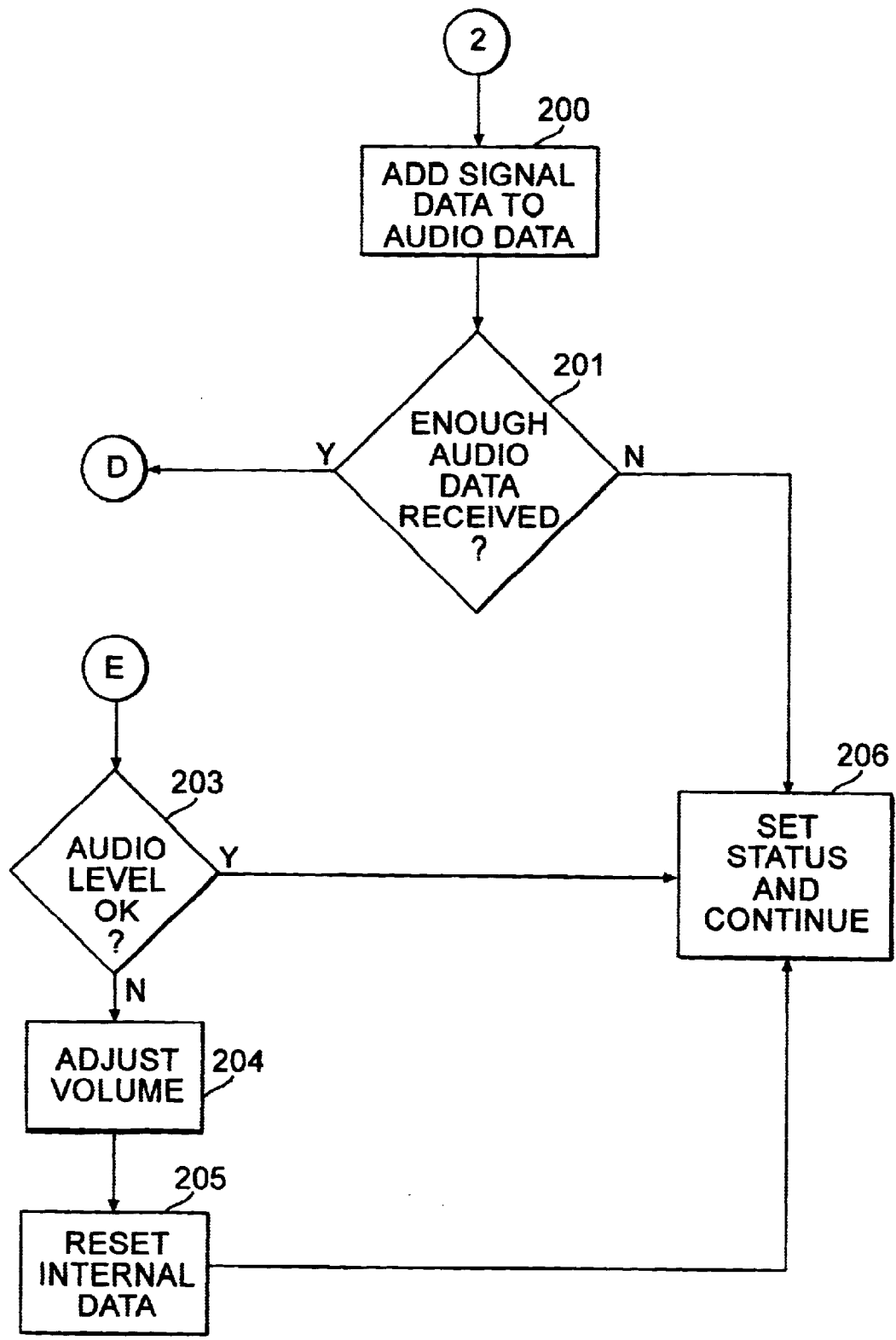
Figure 3D:
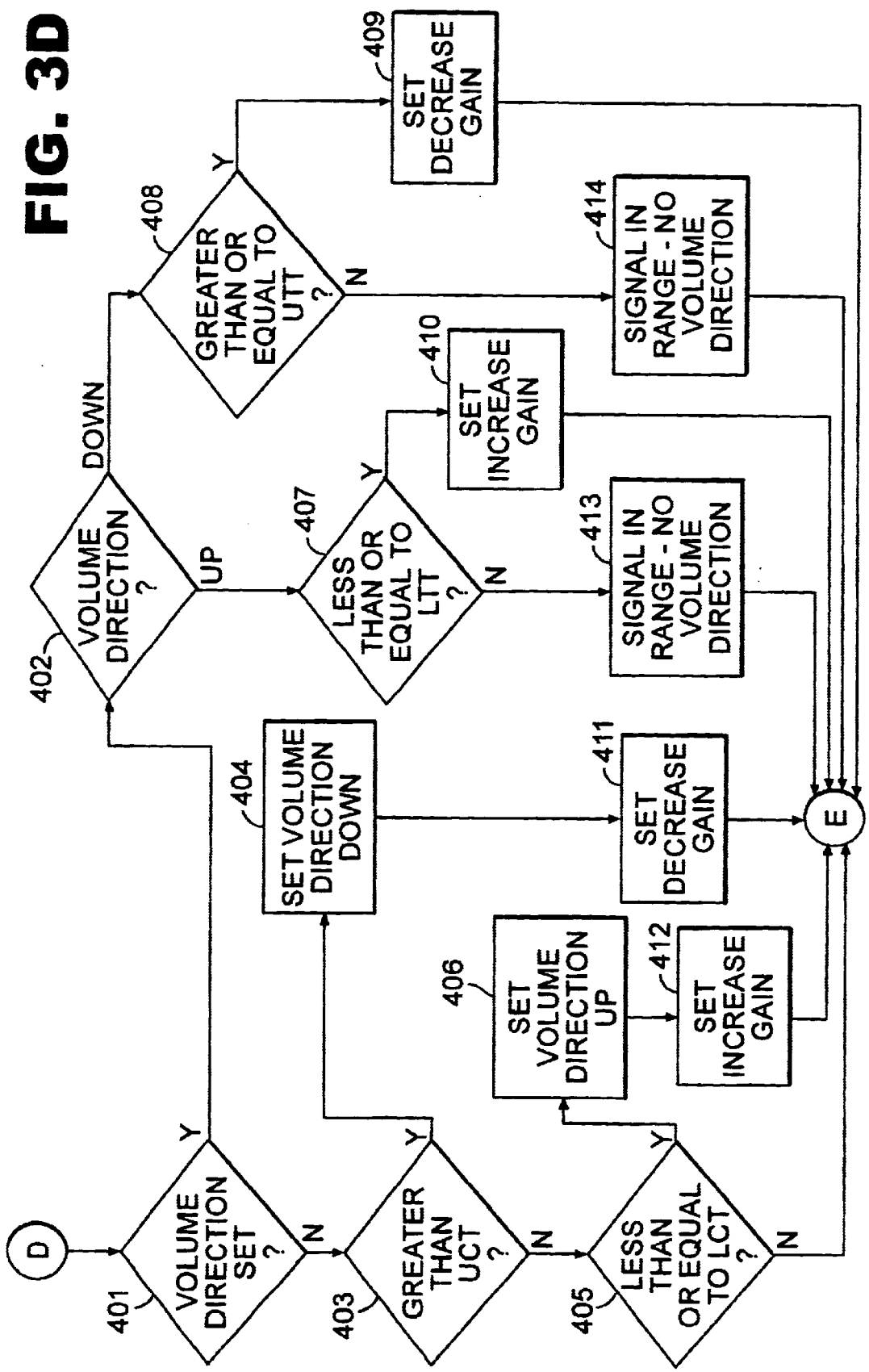

Returning now to FIG. 3A, if in step 104, the measured audio data is interpreted not as silence, but as speech, continuing to FIG. 3C through jump circle 2, in step 200, the audio histogram can be appropriately added to the audio data histogram in accordance with the algorithm discussed above. Subsequently, in step 201, it is determined if the audio data histogram data set has been sufficiently populated with audio data histograms. If it is determined that not enough audio data histograms have been accumulated in the audio data histogram data set so that an effective gain adjustment cannot be calculated based thereon, in step 206, the internal status is recorded and the next frame of audio data can be read. Otherwise, leading through jump circle D to step 401 of FIG. 3D, it is determined whether the gain direction had been previously set as a result of measured samples either exceeding the UCT or falling below the LCT.

If the gain direction had not been previously set, in step 403, it is determined whether the maximum signal amplitude of the MP exceeds the UCT. If so, in step 404, the gain direction parameter can be set to "Down". Additionally, in step 411, a global gain variable can be set to indicate a need to decrease the gain. In step 403, if the maximum signal amplitude of the MP is not greater than the UCT, it is determined in step 405 if the maximum signal amplitude of the MP is less than or equal to the LCT. If so, in step 406, the gain direction can be set to "Up". Additionally, in step 412, a global gain variable can be set to indicate a need to increase the gain. Notably, if the maximum signal amplitude of the MP is neither above the UCT nor below the LCT, the signal amplitude of the digital audio signal is assumed to be in the optimal range. Accordingly, no further actions are necessary.

Returning to step 401, if the gain direction had been set, indicating that the maximum signal amplitude of the MP had fallen in a range equal to or greater than the UTT, or less than or equal to the LTT, in step 402, the gain direction can be determined. If the gain direction had been set to "Up", in step 407, it is further determined if the maximum signal amplitude of the MP is less than or equal to the LTT. If the maximum signal amplitude of the MP is less than or equal to the LTT, in step 410 a global gain variable can be set to indicate a need to increase the gain. Otherwise, in step 413 it is determined that the maximum signal amplitude of the MP is within the optimal range. As such, the gain direction is reset.

Returning to step 402, if the gain direction had been set to "Down", in step 408, it is further determined if the maximum signal amplitude of the MP is greater than or equal to the UTT. If the maximum signal amplitude of the MP is greater than or equal to the UTT, in step 409 a global gain variable can be set to indicate a need to decrease the gain. Otherwise, in step 414 it is determined that the maximum signal amplitude of the MP is within the optimal range. As such, the gain direction is reset. Regardless, in all cases as initially determined in step 401, the method returns to step 203 in FIG. 3C through the jump circle E.

Turning now to FIG. 3C, in step 203, the global variable for indicating a need to adjust the gain is examined. If a gain adjustment is indicated in the global variable, in step 204, the gain can be adjusted in the direction indicated by the gain direction by a small percentage of the available range, typically one or two percent. One skilled in the art will observe, however, that the invention is not limited in this regard. Notably, each sound card is different in that a command to increase or decrease gain can cause the same with varying results. A single bit increase in gain in one sound card can result in an increase in audio gain which can differ from the same single bit increase in gain in another sound card. Thus, the gain can be adjusted according to any suitable adjustment scheme, for example by a predetermined adjustment quantity stored in a table and mapped to observed conditions and sound card type.

Subsequent to the gain adjustment step, in step 205, the audio data histograms in the data set can be discarded. Furthermore, regardless of whether an audio gain adjustment has occurred, in step 206, the internal status can be updated and new frame can be read in from the audio circuitry.

The Audio Gain Optimizer 26 can effectively monitor frames of audio data containing both speech and silence data in order to determine an optimal audio gain setting for particular audio circuitry. Advantageously, the Audio Gain Optimizer perform such modifications to the audio gain dynamically according to changing audio conditions. Hence, the Audio Gain Optimizer 26 effectively addresses the problem of varying amplitudes of speech audio input signals.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method for dynamically adjusting audio input signal gain in a speech system comprising the steps of:
   (a) determining an upper threshold, a lower threshold, and an optimizer threshold, wherein said upper and lower threshold define an optimal range of audio data signal amplitude measurements, and wherein said optimizer threshold is selected from the group consisting of a full scale threshold and a silence threshold;
   (b) receiving a frame of unpredicted digital audio data samples, said unpredicted digital audio data samples acquired by audio circuitry in a computer system, each said sample indicating an amplitude measurement of an audio data signal;
   (c) calculating a maximum signal amplitude corresponding to a configurable measurement percentile of said unpredicted digital audio data samples in said frame;
   (d) comparing said maximum signal amplitude to said optimizer threshold;
   (e) selectively performing a predetermined optimizer action depending on results from said comparing step;
   (f) if said optimizer action has not been performed and if said maximum signal amplitude exceeds said user threshold, incrementally adjusting downward said audio input signal gains;
   (g) if said optimizer action has not been performed and if said maximum signal amplitude falls below aid lower threshold, incrementally adjusting upward said audio input signal gain;
   (h) receiving additional frames of unpredicted digital audio data samples; and,
   (i) repeating steps (c)-(h) with said additional frames of unpredicted digital audio data samples until said calculated maximum signal amplitude falls within said optimal range of audio signal amplitude.

2. The method according to claim 1, wherein said optimizer threshold is said full scale threshold and wherein said comparing and performing steps further comprise the steps of:
   determining a value for said fill scale threshold above which a clipping condition is considered to have occurred;
   calculating a maximum signal amplitude for said digital audio data samples in said received frame; and,
   if said calculated a maximum signal amplitude exceeds said full scale threshold, performing said optimizer action; said optimizer action comprising the steps of:
      calculating a downward adjustment necessary to bring said maximum signal amplitude exceeding said full scale threshold within said optimal range; and,
      adjusting downward said audio input signal gain by said calculated downward adjustment.

3. The method according to claim 1, wherein said optimizer threshold is said full scale threshold, and wherein said comparing and performing step further comprise the steps of:
   determining a value for said full scale threshold above which a clipping condition is considered to have occurred;
   calculating a hypothetical peak signal amplitude for said digital audio data samples in said received frame; and,
   if said calculated hypothetical peak signal amplitude exceeds said full scale threshold, performing said optimizer action; said optimizer action comprising the steps of:
      calculating a downward adjustment necessary to bring said hypothetical peak signal amplitude within said optimal range, and,
      adjusting downward said audio input signal gain by said calculated downward adjustment.

4. The method according to claim 1, wherein said optimizer threshold is said silence threshold and wherein said comparing and performing steps further comprise the steps of:
   determining a value for said silence threshold below which digital audio data samples are interpreted as silence samples and above which digital audio data samples are interpreted as speech samples; and,
   if said maximum signal amplitude exceeds said silence threshold performing said optimizer action, wherein said optimizer action prevents any of said signal gain adjustments from occurring in steps (f) and (g) of claim 1.

5. The method according to claim 4, further comprising the steps of:
   detecting a silence timeout condition, said silence timeout condition occurring when no silence samples are received in a predetermined number of received frames; and,
   responsive to detecting said silence timeout condition, increasing said silence threshold by a proportional factor.

6. The method according to claim 4, further comprising the steps of:
   receiving an unpredicted frame of digital audio data samples having a maximum signal amplitude below said silence threshold, said received frame of digital audio data samples interpreted as a frame of silence samples; and, calculating a new silence threshold based upon maximum amplitude measurements of previously received silence samples.

7. The method according to claim 6, wherein said step of calculating a new silence threshold comprises the steps of:

storing a data set of previously received frames of silence samples;

averaging maximum amplitudes for each stored frame in said data set; and, multiplying said average by a proportional factor.

8. The method according to claim 4, further comprising the steps of:

receiving an unpredicted frame of digital audio data samples having a maximum signal amplitude below said silence threshold, said received frame of digital audio data samples interpreted as a frame of silence samples, said unpredicted frame of silence samples received immediately subsequent to an initial condition; and, calculating a new silence threshold based upon maximum amplitude measurements of a second configurable measurement percentile of previously received speech samples.

9. The method according to claim 8, wherein said step of calculating a new silence threshold comprises the step of;

storing a data set of previously received frames of speech samples; and, identifying a maximum amplitude for said second configurable measurement percentile of speech samples in each stored frame in said data set.

10. The method according to claim 4, further comprising the steps of:

receiving an unpredicted frame of digital audio data samples having a maximum signal amplitude below said silence threshold, said received frame of digital audio data samples interpreted as a frame of silence samples, said unpredicted frame of silence samples received immediately subsequent to an occurrence of a clipping condition; and, calculating a new silence threshold based upon maximum amplitude measurements of a second configurable measurement percentile of previously received speech samples.

11. The method according to claim 10, wherein said step of calculating a new silence threshold comprises the step of:

storing a data set of previously received frames of speech samples; and, identifying a maximum amplitude for said second configurable measurement percentile of speech samples in each stored frame in said data set.

12. The method according to claim 1, wherein said step of receiving an unpredicted frame of digital audio data samples further comprises the steps of:

establishing an audio data histogram, said audio data histogram comprising a plurality of bins, each bin associated with a range of amplitude measurements, each bin having a corresponding counter, each said corresponding counter being incrementable in response to receiving a digital audio data sample having an amplitude measurement falling within an amplitude range associated with said corresponding bin;

responsive to receiving a digital audio data sample having an amplitude measurement falling within an amplitude range associated with a bin in said histogram, incrementing said counter associated with said bin; and, repeating said incrementing step for each digital audio data sample in said frame, said repeating step populating said audio data histogram with histogram data derived from amplitude measurements of said digital audio data samples.

13. The method according to claim 12, wherein said step of incrementally adjusting downward said audio input signal gain comprises the step of:

specifying a measurement percentile of digital audio data samples in said histogram upon which an adjustment is determined;

obtaining a cumulative sum of counters in said histogram, said summation beginning with a zero-th bin in said histogram and continuing to an i-th bin, said cumulative sum when compared to all samples in said histogram corresponding to said specified percentage;

calculating a maximum signal amplitude corresponding to samples in said i-th bin, said calculation based upon only those samples in said i-th bin which are included in said specified percentage of digital audio data samples; and, incrementally adjusting downward said audio input signal gain if said calculated maximum signal amplitude corresponding to said samples in said i-th bin exceeds said upper threshold.

14. The method according to claim 12, wherein said step of incrementally adjusting upward said audio input signal gain comprises the step of:

specifying a measurement percentile of digital audio data samples in said histogram upon which an adjustment is determined;

obtaining a cumulative sum of counters in said histogram, said summation beginning with a zero-th bin in said histogram and continuing to an i-th bin, said cumulative sum when compared to all samples in said histogram corresponding to said specified measurement percentile;

calculating a maximum signal amplitude corresponding to samples in said i-th bin, said calculation based upon only those samples in said i-th bin which are included in said specified measurement percentile of digital audio data samples; and, incrementally adjusting upward said audio input signal gain if said calculated maximum signal amplitude corresponding to said samples in said i-th bin falls below said lower threshold.

15. The method according to claim 12, further comprising the steps of:

storing a data set of audio data histograms; and, determining if said data set has been populated with audio data histograms prior to said gain adjusting steps; and, not performing said gain adjusting steps of it is determined that said data set has not been populated.

16. The method according to claim 15, further comprising the step of:

discarding all audio data histograms in said stored data set responsive to an audio gain adjustment.

17. The method according to claim 4, wherein said step of receiving further comprises the steps of:

establishing a silence data histogram, said silence data histogram comprising a plurality of bins, each bin associated with a range of amplitude measurements, each bin having a corresponding counter, each said corresponding counter being incrementable in response to receiving a silence sample having an amplitude measurement falling within an amplitude range associated with said corresponding bin;

responsive to receiving a silence sample having an amplitude measurement falling within an amplitude range associated with a bin in said histogram, incrementing said counter associated with said bin; and, repeating said incrementing step for each silence sample in said frame, said repeating step populating said silence data histogram with histogram data derived from amplitude measurements of said silence samples.

18. The method according to claim 17, wherein said calculating step comprises the step of:

storing a silence data set of silence data histograms;

averaging maximum amplitudes for each histogram in said silence data set; and, multiplying said average by a proportional factor.

19. The method according to claim 18, further comprising the steps of:

determining if said silence data set has been populated with silence data histograms prior to said silence threshold calculating step; and, not performing said silence threshold calculating step if it is determined that said silence data set has not been populated.

20. The method according to claim 18, further comprising the step of:

discarding all silence data histograms in said stored data set responsive to either an audio gain adjustment or said calculation of a new silence threshold.

21. A machine readable storage, having stored thereon a computer program having a plurality of code sections executable by a machine, said code sections for causing the machine to perform an adjustment of audio input signal gain in a speech system, said code sections performing the steps of:

(a) determining an upper threshold, a lower threshold, and an optimizer threshold, wherein said upper and lower threshold define an optimal range of audio data signal amplitude measurements, and wherein said optimizer threshold is selected from the group consisting of a full scale threshold and a silence threshold;

(b) receiving a frame of unpredicted digital audio data samples, said unpredicted digital audio data samples acquired by audio circuitry in a computer system, each said sample indicating an amplitude measurement of an audio data signal;

(c) calculating a maximum signal amplitude corresponding to a configurable measurement percentile of said unpredicted digital audio data samples in said frame;

(d) comparing said maximum signal amplitude to said optimizer threshold;

(e) selectively performing a predetermined optimizer action depending on results from said comparing step;

(f) if said optimizer action has not been performed and if said maximum signal amplitude exceeds said upper threshold, incrementally adjusting downward said audio input signal gain;

(g) if said optimizer action has not been performed and if said maximum signal amplitude falls below said lower threshold, incrementally adjusting upward said audio input signal gain;

(h) receiving additional frames of unpredicted digital audio data samples; and, (i) repeating steps (c)–(h) with said additional frames of unpredicted digital audio data samples until said calculated maximum signal amplitude falls within said optimal range of audio signal amplitude.

22. The machine readable storage of claim 21, wherein optimizer threshold is said full scale threshold and wherein said comparing and performing steps further causing the machine to perform the steps of:

determining a value for said full scale threshold above which a clipping condition is considered to have occurred;

calculating a maximum signal amplitude for said digital audio data samples in said received frame; and, if said calculated a maximum signal amplitude exceeds said full scale threshold, performing said optimizer action; said optimizer action comprising the steps of:

calculating a downward adjustment necessary to bring said maximum signal amplitude exceeding said full scale threshold within said optimal range; and, adjusting downward said audio input signal gain by said calculated downward adjustment.

23. The machine readable storage of claim 21, wherein said optimizer threshold is said full scale threshold, and wherein said comparing and performing steps further causing the machine to perform the steps of:

determining a value for said full scale threshold above which a clipping condition is considered to have occurred;

calculating a hypothetical peak signal amplitude for said digital audio data samples in said received frame; and, if said calculated hypothetical peas signal amplitude exceeds said full scale threshold, performing said optimizer action; said optimizer action comprising the steps of:

calculating a downward adjustment necessary to bring said hypothetical peak signal amplitude within said optimal range; and, adjusting downward said audio input signal gain by said calculated downward adjustment.

24. The machine readable storage of claim 21, wherein said optimizer threshold is said silence threshold and wherein said comparing and performing steps further causing the machine to perform the steps of:

determining a value for said silence threshold below which digital audio data samples are interpreted as silence samples and above which digital audio data samples are interpreted as speech samples; and, if said maximum signal amplitude exceeds said silence threshold, performing said optimizer action, wherein said optimizer action prevents any of said signal gain adjustments from occurring in steps (f) and (g) of claim 1.

25. The machine readable storage of claim 24, for further causing the machine to perform the steps of:

detecting a silence timeout condition, said silence timeout condition occurring when no silence samples are received in a predetermined number of received frames; and, responsive to detecting said silence timeout condition, increasing said silence threshold by a proportional factor.

26. The machine readable storage of claim 24, for further causing the machine to perform the steps of:

receiving an unpredicted frame of digital audio data samples having a maximum signal amplitude below said silence threshold, said received frame of digital audio data samples interpreted as a frame of silence samples; and, calculating a new silence threshold based upon maximum amplitude measurements of previously received silence samples.

27. The machine readable storage of claim 26, wherein said step of calculating a new silence threshold comprises the steps of:

storing a data set of previously received frames of silence samples;

averaging maximum amplitudes for each stored frame in said data set; and, multiplying said average by a proportional factor.

28. The machine readable storage of claim 21, for further causing the machine to perform the steps of:

receiving an unpredicted frame of digital audio data samples having a maximum signal amplitude below said silence threshold, said received frame of digital audio data samples interpreted as a frame of silence samples, said unpredicted frame of silence samples received immediately subsequent to an initial condition; and, calculating a new silence threshold based upon maximum amplitude measurements of a second configurable measurement percentile of previously received speech samples.

29. The machine readable storage of claim 28, wherein said step of calculating a new silence threshold comprises the step of:

storing a data set of previously received frames of speech samples; and, identifying a maximum amplitude for said second configurable measurement percentile of speech samples in each stored frame in said data set.

30. The machine readable storage of claim 24, for further causing the machine to perform the steps of:

receiving an unpredicted frame of digital audio data samples having a maximum signal amplitude below said silence threshold, said received frame of digital audio data samples interpreted as a frame of silence samples, said unpredicted frame of silence samples received immediately subsequent to an occurrence of a clipping condition; and, calculating a new silence threshold based upon maximum amplitude measurements of a second configurable measurement percentile of previously received speech samples.

31. The machine readable storage of claim 30, wherein said step of calculating a new silence threshold comprises the step of:

storing a data set of previously received frames of speech samples; and, identifying a maximum amplitude for said second configurable measurement percentile of speech samples in each stored frame in said data set.

32. The machine readable storage of claim 21, wherein said step of receiving an unpredicted frame of digital audio data samples further comprises the steps of:

establishing an audio data histogram, said audio data histogram comprising a plurality of bins, each bin associated with a range of amplitude measurements, each bin having a corresponding counter, each said corresponding counter being incrementable in response to receiving a digital audio data sample having an amplitude measurement falling within an amplitude range associated with said corresponding bin;

responsive to receiving a digital audio data sample having an amplitude measurement falling within an amplitude range associated with a bin in said histogram, incrementing said counter associated with said bin; and, repeating said incrementing step for each digital audio data sample in said frame, said repeating step populating said audio data histogram with histogram data derived from amplitude measurements of said digital audio data samples.

33. The machine readable storage of claim 32, wherein said step of incrementally adjusting downward said audio input signal gain comprises the step of:

specifying a measurement percentile of digital audio data samples in said histogram upon which an adjustment is determined;

obtaining a cumulative sum of counters in said histogram, said summation beginning with a zero-th bin in said histogram and continuing to an i-th bin, said cumulative sum when compared to all samples in said histogram corresponding to said specified measurement percentile;

calculating a maximum signal amplitude corresponding to samples in said i-th bin, said calculation based upon only those samples in said i-th bin which are included in said measurement percentile of digital audio data samples; and, incrementally adjusting downward said audio input signal gain if said calculated maximum signal amplitude corresponding to said samples in said i-th bin exceeds said upper threshold.

34. The machine readable storage of claim 32, wherein said step of incrementally adjusting upward said audio input signal gain comprises the step of:

specifying a measurement percentile of digital audio data samples in said histogram upon which an adjustment is determined:

obtaining a cumulative sum of counters in said histogram, said summation beginning with a zero-th bin in said histogram and continuing to an i-th bin, said cumulative sum when compared to all samples in said histogram corresponding to said specified measurement percentile;

calculating a maximum signal amplitude corresponding to samples in said i-th bin, said calculation based upon only those samples in said i-th bin which are included in said specified measurement percentile of digital audio data samples; and, incrementally adjusting upward said audio input signal gain if said calculated maximum signal amplitude corresponding to said samples in said i-th bin falls below said lower threshold.

35. The machine readable storage of claim 32, for further causing the machine to perform the steps of:

storing a data set of audio data histograms; and, determining if said data set has been populated with audio data histograms prior to said gain adjusting steps; and, not performing said gain adjusting steps of it is determined that said data set has not been populated.

36. The machine readable storage of claim 35, for further causing the machine to perform the steps of:

discarding all audio data histograms in said stored data set responsive to an audio gain adjustment.

37. The machine readable storage of claim 24, wherein said step of receiving further comprises the steps of:

establishing a silence data histogram, said silence data histogram comprising a plurality of bins, each bin associated with a range of amplitude measurements, each bin having a corresponding counter, each said corresponding counter being incrementable in response to receiving a silence sample having an amplitude measurement falling within an amplitude range associated with said corresponding bin;

responsive to receiving a silence sample having an amplitude measurement falling within an amplitude range associated with a bin in said histogram, incrementing said counter associated with said bin; and, repeating said incrementing step for each silence sample in said frame, said repeating step populating said silence data histogram with histogram data derived from amplitude measurements of said silence samples.

38. The machine readable storage of claim 37, wherein said calculating step comprises the step of:

storing a silence data set of silence data histograms;

averaging maximum amplitudes for each histogram in said silence data set; and, multiplying said average by a proportional factor.

39. The machine readable storage of claim 37, for further causing the machine to perform the steps of:

determining if said silence data set has been populated with silence data histograms prior to said silence threshold calculating step; and, not performing said silence threshold calculating step if it is determined that said silence data set has not been populated.

40. The machine readable storage of claim 38, for further causing the machine to perform the steps of:

discarding all silence data histograms in said stored data set responsive to either an audio gain adjustment or said calculation of a new silence threshold.

* * * * *